Feb. 18, 1941.   W. A. GIBBONS   2,232,109
MANUFACTURE OF MICROPOROUS ARTICLES
Filed May 12, 1938
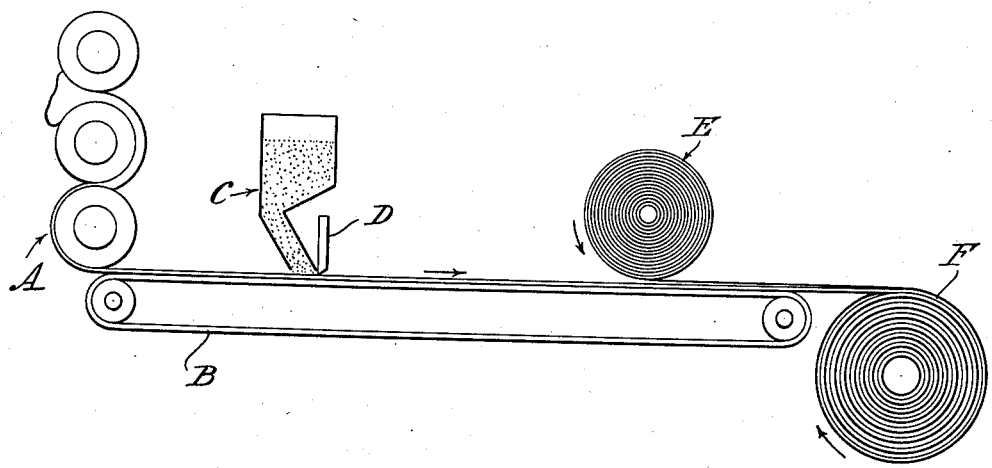
INVENTOR.
WILLIS A. GIBBONS
BY
ATTORNEYS Patented Feb. 18, 1941

2,232,109

UNITED STATES PATENT OFFICE 2,232,109

MANUFACTURE OF MICROPOROUS ARTICLES

Willis A. Gibbons, Montclair, N. J., assignor, by mesne assignments, to United States Rubber Company, New York, N. Y., a corporation of New Jersey Application May 12, 1938, Serial No. 207,483

4 Claims. (Cl. 18—53)

This invention relates to the manufacture of microporous articles, more particularly battery plate separators, from heat-hardenable plastics patterned with designed areas, prior to curing or setting.

More particularly the invention relates to a method of retaining the shape or contour of said designed areas of said plastics during the heating or curing thereof. For example, in the manufacture of battery plate separators which have a predetermined contour impressed or engraved or otherwise created thereon, for example in the form of ridges or corrugations, an object of the invention is to hold the impressed or engraved design in place and maintain its sharp definition while heat-hardening the plastic. This object is attained herein by spreading on the profiled base of the sheet a layer or coating of substantially dry finely divided or powdered water-insoluble solid material so as to fill the depressed areas and form at least a thin layer over the raised areas.

Thereafter the composite plastic sheet,—in the case of rubber, containing sulphur sufficient to form hard rubber,—is vulcanized under conditions which confine the mass under positive restraining forces until a hard rubber vulcanizate has been obtained. Such a procedure may consist of rolling the composite sheet up on a drum with or without a cloth liner to separate the layers, or simply stacking the composites on trays or in a number of layers, one upon another. For the production of microporous articles, cures are carried out under non-evaporative conditions; either open steam or submarine cure may be used, as set forth in U. S. P. No. 2,112,529, wherein hydrophilic colloids such as bentonite are used for developing microporosity. The introduction and dissemination of water throughout the mass may also be obtained by the addition of colloids having associated water, for example hydrous silicic acid gels, prior to shaping and curing.

The plasticized rubber compounded with vulcanizing ingredients such as bentonite or the hydrous silicic acid gel, etc., as shown in the drawing, is given the desired profile by passage through a suitably engraved calendered roll or rolls A. The ribbed or corrugated sheet is then conveyed along a belt B under a mechanism C consisting of a container from which powder, for example talc, is flowed onto the sheet either by gravity or by mechanical feed, and a scraper D levels off the powder in the desired manner. If desired, a known vibrator knife attachment may be used for applying the powder to the calendered sheet. A liner, usually fabric, is then unrolled from a drum E and applied to the composite plastic sheet and powder, and afterwards the entire assembly is rolled up on a drum F. The drum F carrying the rolled-up assembly (including the temporary talc filling for the depressed areas in the sheet) is afterwards immersed in water or steam heated to a vulcanizing temperature to cure the rubber and develop microporosity in the rubber.

If desired, water may be applied to the talc coating after it has filled the valleys, as by spraying water thereon, either before, during or after the application of the fabric liner from drum E. Another variation is to immerse the drum containing the wrapped composite assembly of plastic sheet and powder in water prior to or during the vulcanization stage. After vulcanization, the material used to maintain the profile, for example talc, is washed off or otherwise removed from the surface of the vulcanized sheet, and the sheet is cut into finished separators of the dimensions desired.

Rubber products fashioned, treated and cured according to the present invention have even, undisturbed surfaces, with the sharpness of the profile design faithfully preserved.

Examples of other fillings than talc, which act as a temporary matrix and which are usable in the process, are whiting or other forms of calcium carbonate; finely divided silica, such as infusorial earth; natural silicates, such as talc or clays. In general, one may use any finely divided substantially dry solid which is substantially inert chemically toward rubber or other ingredients compounded therein.

The advantages of using from the beginning substantially dry temporary filling such as talc instead of wet pastes are several. The wet paste includes higher costs of preparation, requires more elaborate control of the physical properties of the wet paste, and in general is more complicated in application than the original use of substantially dry powders.

Having thus described my invention, what I claim and desire to protect by Letters Patent is:

1. A method of manufacturing from heat-hardenable plastic stock, articles having predetermined relief designs in the surface thereof, which comprises forming such design areas and applying a temporary filling of substantially dry finely divided water-insoluble material to such areas to fill and cover over at least the valleys of the surface design, curing or setting the plastic while said filling is confined in association with the surface of the plastic under positive restraining pressure, said filling acting as a temporary matrix to maintain the definition of the design, and thereafter removing the temporary filling.

2. A method of manufacturing from heat-hardenable plastic stock, articles having predetermined relief designs in the surface thereof, which comprises forming such design areas and applying a temporary filling of substantially dry finely divided water-insoluble material to such areas to fill and cover over at least the valleys of the surface design, then wetting the filling, curing or setting the plastic while said filling is confined in association with the surface of the plastic under positive restraining pressure, said filling acting as a temporary matrix to maintain the definition of the design, and thereafter removing the temporary filling.

3. A method of manufacturing a rubber article bearing relatively sharply depressed surface areas which comprises forming such areas and applying a temporary filling of substantially dry finely divided water-insoluble material to such areas to fill and cover over at least the valleys of the surface design, curing the rubber while said filling is confined in association with the rubber, said filling acting as a temporary matrix to maintain the definition of the design, and thereafter removing the temporary filling.

4. A method of manufacturing hard rubber battery plate separators having ribbed or corrugated self-reenforcements which comprises shaping a water permeated unvulcanized hard rubber composition into sheet form having such reenforcements, applying a coating of a substantially dry finely divided water-insoluble material to the ribbed or corrugated surfaces so as to fill the valleys and form an even surface over the sheet, and confining the coated sheet so as to keep the coating intact during subsequent operations including curing the rubber under non-evaporative conditions.

WILLIS A. GIBBONS.